(12) United States Patent
Kurota

(10) Patent No.: US 9,875,074 B2
(45) Date of Patent: Jan. 23, 2018

(54) PROJECTION DEVICE AND CONTROL METHOD THEREFOR

(71) Applicant: CANON KABUSHIKI KAISHA, Tokyo (JP)

(72) Inventor: Masaru Kurota, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/084,325

(22) Filed: Mar. 29, 2016

(65) Prior Publication Data

US 2016/0291919 A1    Oct. 6, 2016

(30) Foreign Application Priority Data

Apr. 2, 2015 (JP) .................................. 2015-076125

(51) Int. Cl.
*H04N 5/64* (2006.01)
*H04N 9/31* (2006.01)
*G06F 3/14* (2006.01)

(52) U.S. Cl.
CPC .......... *G06F 3/1446* (2013.01); *H04N 9/3147* (2013.01); *H04N 9/3185* (2013.01); *G09G 2320/0693* (2013.01); *G09G 2356/00* (2013.01); *G09G 2370/20* (2013.01)

(58) Field of Classification Search
CPC .......... H04N 9/31; H04N 9/3185; H04N 5/66; H04N 9/3147; H04N 9/3194; G06F 3/14; G06F 3/1446; G09G 2320/0693; G09G 2356/00; G09G 2370/20

USPC .................................................. 348/744, 745
See application file for complete search history.

(56) References Cited

U.S. PATENT DOCUMENTS

| 8,042,954 B2 * | 10/2011 | Tan ....................... H04N 9/3147 353/121 |
| 8,550,635 B2 * | 10/2013 | Kotani ................... G03B 21/14 348/745 |
| 9,292,945 B2 * | 3/2016 | Kubota ................. G06T 11/003 |

FOREIGN PATENT DOCUMENTS

| JP | 2006-338044 | * 12/2006 | ............... H04N 5/66 |
| JP | 2006-338044 A | 12/2006 | |

* cited by examiner

*Primary Examiner* — Trang U Tran
(74) *Attorney, Agent, or Firm* — Canon USA, Inc. I.P. Division

(57) ABSTRACT

When each of a plurality of projection devices projects an image on a screen, in order to easily determine whether or not an association between identification information of each of the plurality of projection devices and positional relationship of each of the plurality of projection devices is correct, an image for notifying of an association between a predetermined area included in a display pattern and an external projection device is projected, and a communication unit of a projection device transmits information related to the association between the predetermined area included in the display pattern and the external projection device, which is inputted by an input unit, to the external projection device.

10 Claims, 13 Drawing Sheets

PROJECTION DEVICE AND CONTROL METHOD THEREFOR

BACKGROUND OF THE INVENTION

Field of the Invention

The present disclosure relates to a projection device and a control method therefor.

Description of the Related Art

Conventionally, a multiple projection system is known which displays one projection image by synthesizing, on a screen, a plurality of images projected onto the screen by each of a plurality of projectors.

It is known that, in the multiple projection system, one projector (a master) of a plurality of projectors controls the other projectors (slaves).

For example, Japanese Patent Application Laid-Open No. 2006-338044 discloses that, in the multiple projection system, one projector (a master) of a plurality of projectors associates identification information of the other projectors (slaves) with positional relationship of the other projectors (slaves). Further, it is known that the projector (master) notifies a position in one projection image displayed on a screen by the multiple projection system, to which a position of an image projected by another projector (slave) corresponds, to another projector (slave).

However, conventionally, a method that causes a user to easily determine whether the association between the identification information of another projector (slave) and the positional relationship of another projector (slave) is correct or not is not considered. Therefore, in a state in which the association between the identification information of another projector (slave) and the positional relationship of another projector (slave) is not correct, a user may cause all the projectors of the multiple projection system to project an image. Thereby, there is a possibility that a desired projection image is not displayed on a screen at a desired timing in the multiple projection system.

SUMMARY OF THE INVENTION

At least one aspect of the present disclosure is to solve all or at least one of the issues described above.

In an aspect of the present disclosure, a projection device includes a projection unit configured to project an image, a communication unit configured to communicate with an external projection device, and an input unit configured to input an association between the external projection device and a predetermined area included in a display pattern for displaying one image on a screen by using an image projected by the projection device and an image projected by the external projection device. In the projection device, the projection unit projects an image for notifying of the association between the external projection device and the predetermined area included in the display pattern, which is inputted by the input unit, and the communication unit transmits information related to the association between the external projection device and the predetermined area included in the display pattern, which is inputted by the input unit, to the external projection device.

According to other aspects of the present disclosure, one or more additional projection devices, one or more control methods therefor and one or more mediums are discussed herein. Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the disclosure and, together with the description, serve to explain the principles of the disclosure.

DESCRIPTION OF THE EMBODIMENTS

Various exemplary embodiments, features, and aspects of the disclosure will be described in detail below with reference to the drawings.

First Embodiment

Figure 1:
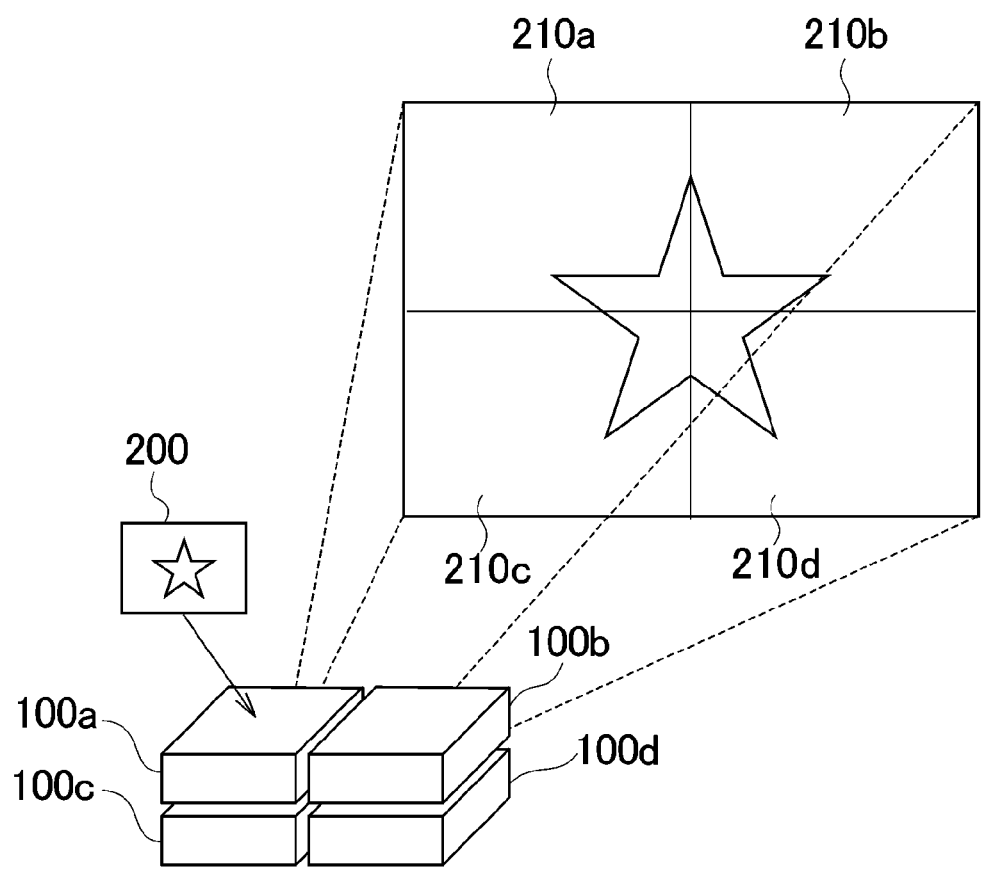
FIG. 1 is a diagram illustrating an example of a multiple projection system in first to third embodiments.

FIG. 1 is a diagram illustrating a multiple projection system in the first embodiment. The multiple projection system is a system that displays one image on a screen by synthesizing, on the screen, images projected onto the screen by each of a plurality of projectors.

The multiple projection system of the first embodiment includes four projectors 100*a* to 100*d*. The projectors 100*a* to 100*d* respectively project four partial images 210*a* to 210*d*, which are obtained by dividing one image 200 to be displayed on a screen into four images, onto the screen. Thereby, the partial images 210*a* to 210*d* are displayed on the screen and one image corresponding to the image 200 is displayed on the screen by combining the four partial images 210*a* to 210*d*. The partial image 210*a* may include at least one of a part of the partial image 210*b*, a part of the partial image 210*c*, and a part of the partial image 210*d*. In the same manner, the partial image 210b may include at least one of a part of the partial image 210a, a part of the partial image 210c, and a part of the partial image 210d. In the same manner, the partial image 210c may include at least one of a part of the partial image 210a, a part of the partial image 210b, and a part of the partial image 210d. In the same manner, the partial image 210d may include at least one of a part of the partial image 210a, a part of the partial image 210b, and a part of the partial image 210c.

In the first embodiment, a case where each of the projectors 100a to 100d projects a partial image obtained by dividing one image is described as an example. However, an image projected onto the screen by each of the projectors 100a to 100d may be an image other than a partial image obtained by dividing one image. The projector in the first embodiment may be rephrased to a "projection device" or may be rephrased to a "display device".

The number of projectors included in the multiple projection system is not limited to four, but may be two. The number of projectors included in the multiple projection system may be two or more.

In the description of the first embodiment, it is assumed that the projector 100a of the projectors 100a to 100d is set as a master device and the other projectors 100b to 100d are set as slave devices. In the multiple projection system, the projector 100a transmits the image 200 to the projectors 100b to 100d. Further, each of the projectors 100b to 100d generates a partial image from the image 200 and projects the generated partial image onto the screen. For example, the projector 100b generates a partial image 210b from the image 200 received from the projector 100a and projects the partial image 210b onto the screen. Further, for example, the projector 100c generates a partial image 210c from the image 200 received from the projector 100a and projects the partial image 210c onto the screen. Further, for example, the projector 100d generates a partial image 210d from the image 200 received from the projector 100a and projects the partial image 210d onto the screen.

Figure 2A:
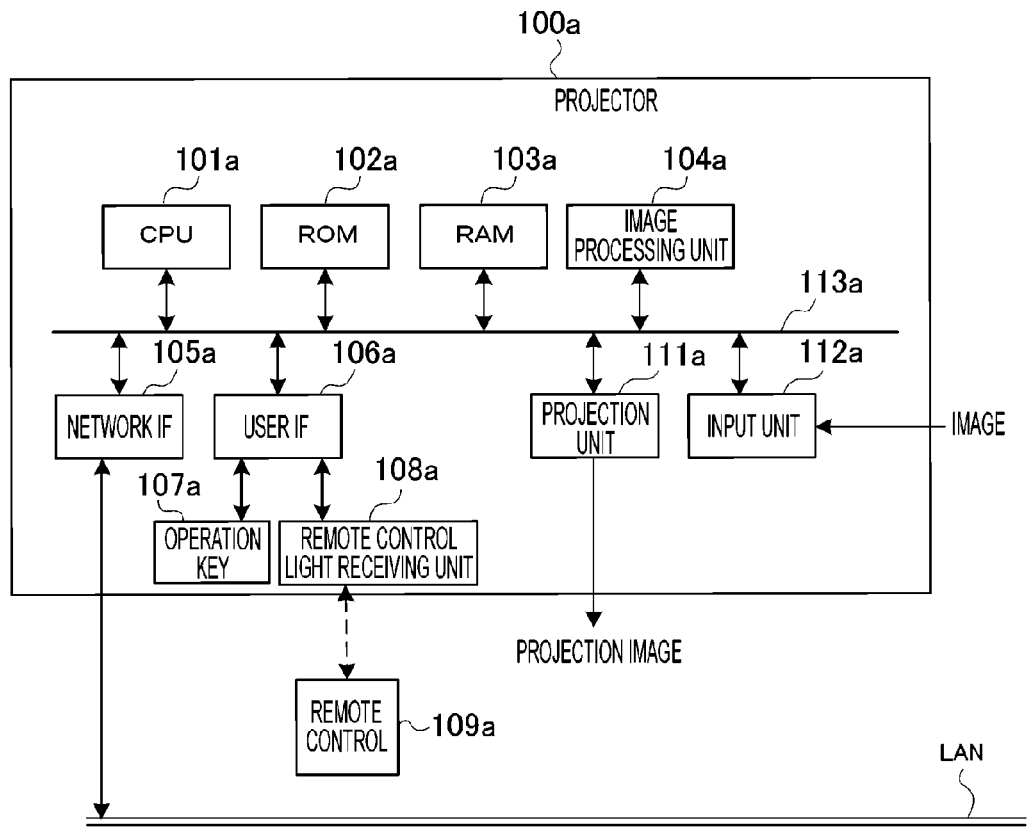
FIGS. 2A and 2B are diagrams illustrating an example of a configuration of a projector in the first to the third embodiments.
Figure 2B:
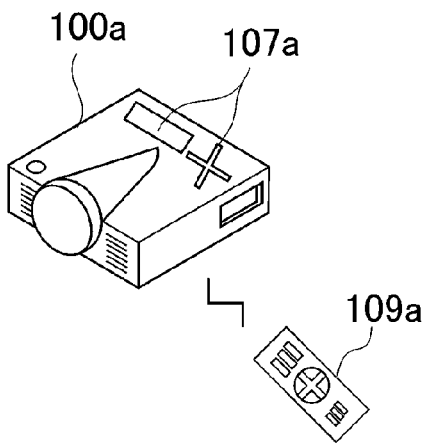

FIGS. 2A and 2B are diagrams illustrating an example of a configuration of the projector 100a. FIG. 2A is a diagram illustrating an example of a configuration of the projector 100a and FIG. 2B is an external view illustrating an example of the projector 100a.

The projector 100a includes a CPU (Central Processing Unit) 101a, a ROM 102a, a RAM 103a, an image processing unit 104a, a network IF (Interface) 105a, and a user IF 106a. Further, the projector 100a includes an operation key 107a, a remote control light-receiving unit 108a, a projection unit 111a, an input unit 112a, and an internal bus 113a.

The CPU 101a is a control unit that controls each unit of the projector 100a. The ROM 102a stores a computer program to be executed by the CPU 101a. The RAM 103a temporarily stores a computer program and data as a work memory. The CPU 101a controls the projector 100a by executing the program stored in the ROM 102a.

The image processing unit 104a performs image processing to generate an image to be projected by the projection unit 111a. For example, the image processing unit 104a performs light reduction processing (gradation processing) on an image that overlaps a part of an image projected by a projector other than the projector 100a in an image projected by the projection unit 111a. The image that overlaps a part of an image projected by a projector other than the projector 100a is referred to as an "overlapping area".

The network IF 105a communicates with an external projector (an external projection device) through a LAN (Local Area Network). The network IF 105a may communicate with an external projector through a wireless LAN or may communicate with an external projector through a wired LAN. The network IF 105a may communicate with an external projector based on a communication protocol other than LAN.

The user IF 106a receives an input by a user from at least either one of the operation key 107a and a remote control unit 109a. The remote control light-receiving unit 108a supplies a signal received from the remote control unit 109a to the user IF 106a.

The projection unit 111a projects an image supplied from the image processing unit 104a. The projection unit 111a includes a liquid crystal panel and a driver that drives the liquid crystal panel. Further, the projection unit 111a includes a drive system such as a lens and a zoom and a control system that controls a light source and a position of an image to be projected. The input unit 112a receives an image from outside. The internal bus 113a connects units included in the projector 100a. The remote control unit 109a is used to control the projector 100a.

While the projector 100a has been described, the projectors 100b to 100d also have the same configuration as that of the projector 100a. For example, in the same manner as the projector 100a, the projector 100b includes a CPU 101b, a ROM 102b, a RAM 103b, an image processing unit 104b, a network IF 105b, and a user IF 106b. Further, the projector 100b includes an operation key 107b, a remote control light-receiving unit 108b, a projection unit 111b, an input unit 112b, and an internal bus 113b. For example, in the same manner as the projector 100a, the projector 100c includes a CPU 101c, a ROM 102c, a RAM 103c, an image processing unit 104c, a network IF 105c, and a user IF 106c. Further, the projector 100c includes an operation key 107c, a remote control light-receiving unit 108c, a projection unit 111c, an input unit 112c, and an internal bus 113c. For example, in the same manner as the projector 100a, the projector 100d includes a CPU 101d, a ROM 102d, a RAM 103d, an image processing unit 104d, a network IF 105d, and a user IF 106d. Further, the projector 100d includes an operation key 107d, a remote control light-receiving unit 108d, a projection unit 111d, an input unit 112d, and an internal bus 113d.

Next, an operation of the projector 100a will be described. The projector 100a supplies an image received through at least either one of the input unit 112a and the network IF 105a to the image processing unit 104a. Thereafter, the projector 100a controls the projection unit 111a so as to project an image on which image processing is performed by the image processing unit 104a onto a screen. While the operation of the projector 100a has been described, the projectors 100b to 100d also perform the same operation as that performed by the projector 100a.

Figure 3:
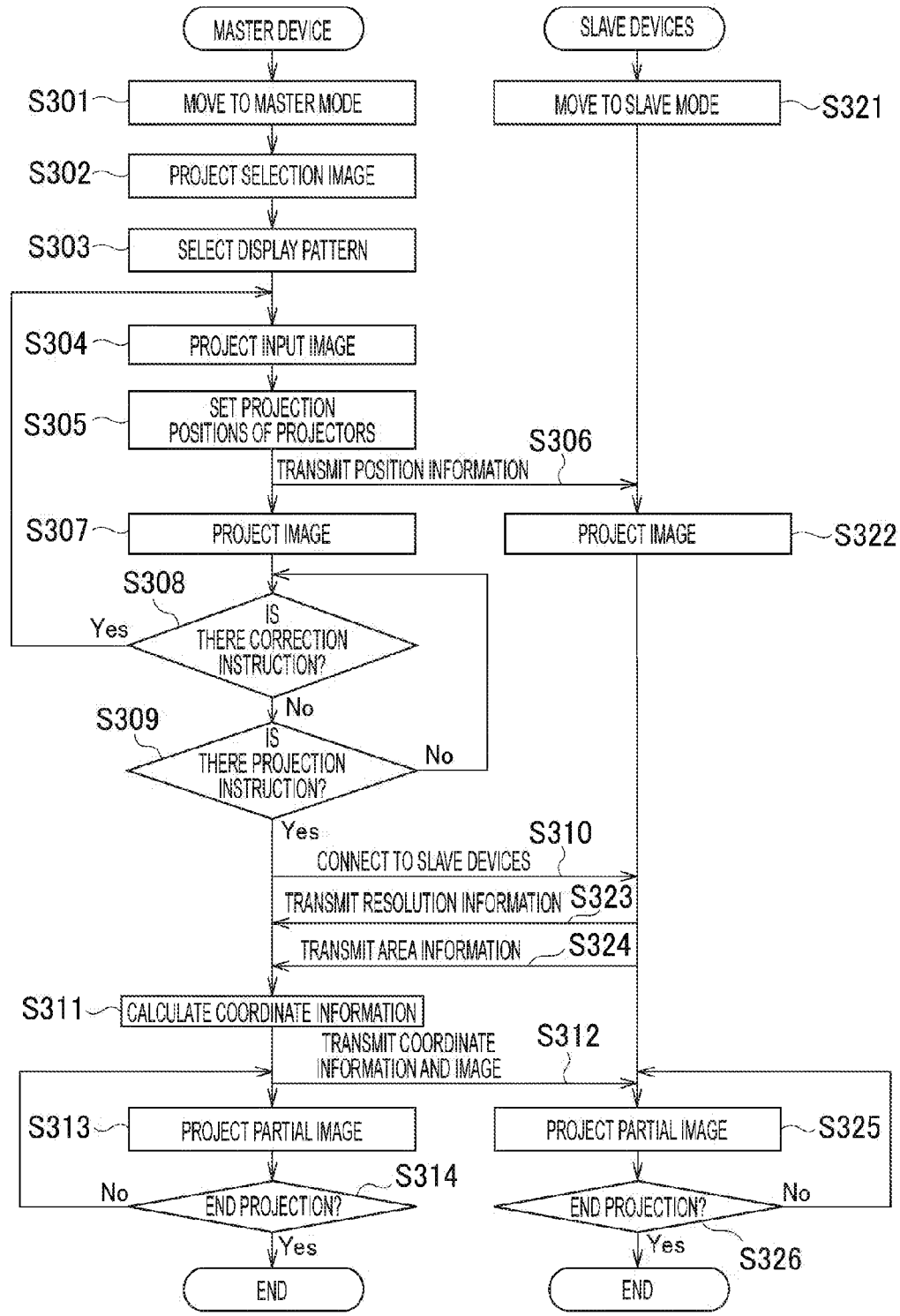
FIG. 3 is a sequence diagram illustrating an example of projection processing performed in the first embodiment.

FIG. 3 is a sequence diagram illustrating an example of projection processing performed by the multiple projection system in the first embodiment. The projection processing illustrated in FIG. 3 will be described by using an example in which the projector 100a is set as a master device and the projectors 100b to 100d are set as slave devices.

When a user operates at least either one of the operation key 107a and the remote control unit 109a and thereby the projector 100a is selected as the master device, the CPU 101a performs S301. In S301, the CPU 101a receives a master selection instruction through the user IF 106a. Thereafter, the CPU 101a sets an operation mode of the projector 100a to a master mode in which the projector 100a operates as the master device. In this case, the CPU 101a stores a value indicating that the projector 100a is set to the master device into the RAM 103a. After S301 is performed, the CPU 101a performs S302.

When the user operates at least either one of the operation key 107b and the remote control unit 109b in the projector 100b and thereby the projector 100b is selected as the slave device, the CPU 101b performs S321. In S321, the CPU 101b receives a slave selection instruction through the user IF 106b. Thereafter, the CPU 101b sets an operation mode of the projector 100b to a slave mode in which the projector 100b operates as the slave device. In this case, the CPU 101b stores a value indicating that the projector 100b is set to the slave device into the RAM 103b. The projectors 100c and 100d also perform the same operation as that of the projector 100b in S321.

In S302, the CPU 101a controls the projection unit 111a so as to project a selection image 400. Thereafter, the projection unit 111a projects the selection image 400 onto a screen. The selection image 400 is an image to select a display pattern of an image to be displayed on the screen by the multiple projection system.

Figure 4:
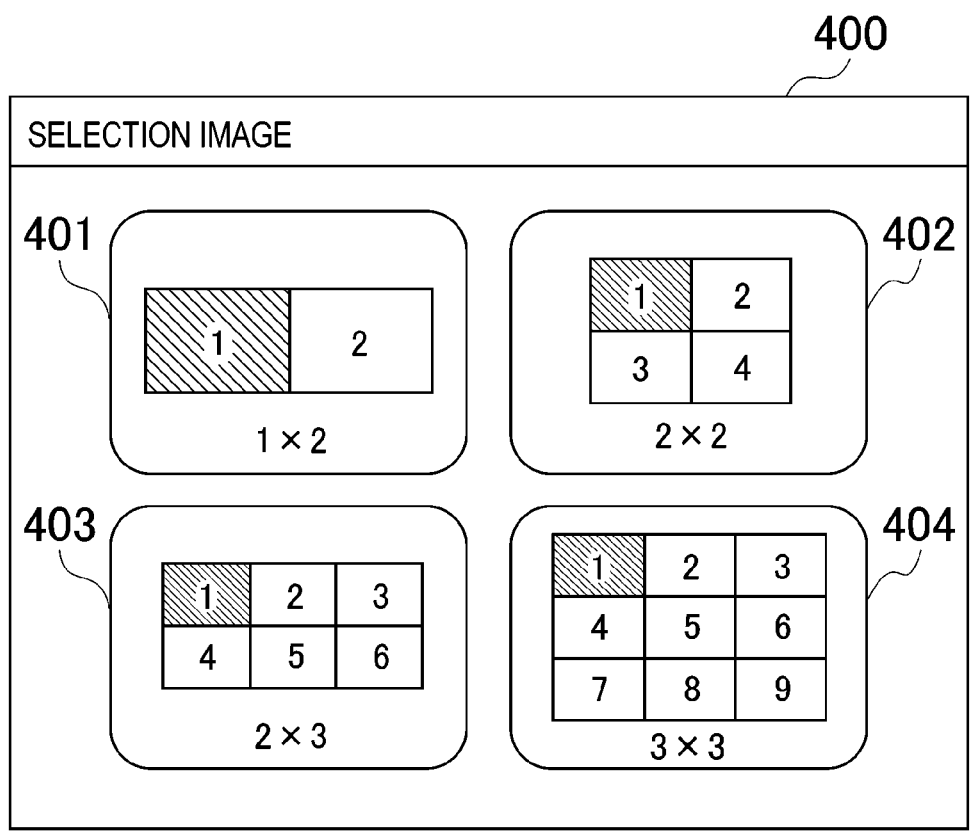
FIG. 4 is a diagram illustrating an example of a selection image in the first to the third embodiments.

FIG. 4 is a diagram illustrating an example of the selection image 400. The selection image 400 is an image to select a display pattern of an image to be displayed on the screen by the multiple projection system from among display patterns 401 to 404. The display patterns 401 to 404 are images which respectively represent display patterns different from each other.

The display pattern 401 is an image representing a pattern in which two partial images are arranged in the horizontal direction and displayed on the screen by two projectors. Further, in the display pattern 401, a predetermined area which is an area where one partial image is projected and identification information for identifying a position of the predetermined area are associated with each other. For example, identification information "1" is information for identifying a position of a predetermined area of the left partial image. Further, for example, identification information "2" is information for identifying a position of a predetermined area of the right partial image.

The display pattern 402 is an image representing a pattern of 2×2. The display pattern 402 is an image representing a pattern in which four partial images are displayed on the screen by four projectors. Further, in the display pattern 402, a predetermined area which is an area where one partial image is projected and identification information for identifying the position of the predetermined area are associated with each other. For example, identification information "1" is information for identifying a position of a predetermined area of the upper left partial image. Further, for example, identification information "2" is information for identifying a position of a predetermined area of the upper right partial image. Further, for example, identification information "3" is information for identifying a position of a predetermined area of the lower left partial image. Further, for example, identification information "4" is information for identifying a position of a predetermined area of the lower right partial image.

The display pattern 403 is an image representing a display pattern of 2×3. The display pattern 403 is an image representing a pattern in which six partial images are displayed on the screen. Further, in the display pattern 403, a predetermined area which is an area where one partial image is projected and identification information for identifying a position of the predetermined area are associated with each other.

The display pattern 404 is an image representing a display pattern of 3×3. The display pattern 404 is an image representing a pattern in which nine partial images projected on the screen by nine projectors are displayed on the screen. Further, in the display pattern 403, a predetermined area which is an area where one partial image is projected and identification information for identifying a position of the predetermined area are associated with each other.

The display patterns 401 to 404 and the selection image 400 are stored in advance in the ROM 102a of the projector 100a which is the master device.

In S302, the selection image 400 is displayed on the screen by the projection unit 111a. In this case, a user selects any one of the display patterns 401 to 404 by using at least either one of the operation key 107a and the remote control unit 109a. When the user selects any one of the display patterns 401 to 404 by using at least either one of the operation key 107a and the remote control unit 109a, the CPU 101a performs S303.

In S303, the CPU 101a receives a selection instruction of a display pattern through the user IF 106a. Thereafter, the CPU 101a selects any one of the display patterns 401 to 404 according to the selection instruction from the user and records information indicating the selected display pattern in the RAM 103a. After S303 is performed, the CPU 101a performs S304.

Hereinafter, a case in which the display pattern 402 is selected by the user in S303 will be described as an example. In this case, in S303, the CPU 101a selects the display pattern 402 and stores information indicating the display pattern 402 in the RAM 103a.

In S304, the CPU 101a controls the projection unit 111a so as to project an input image 500. Further, the CPU 101a secures an area to assign IP addresses to a plurality of pieces of identification information of the display pattern selected in S302 in the RAM 103a.

Figure 5:
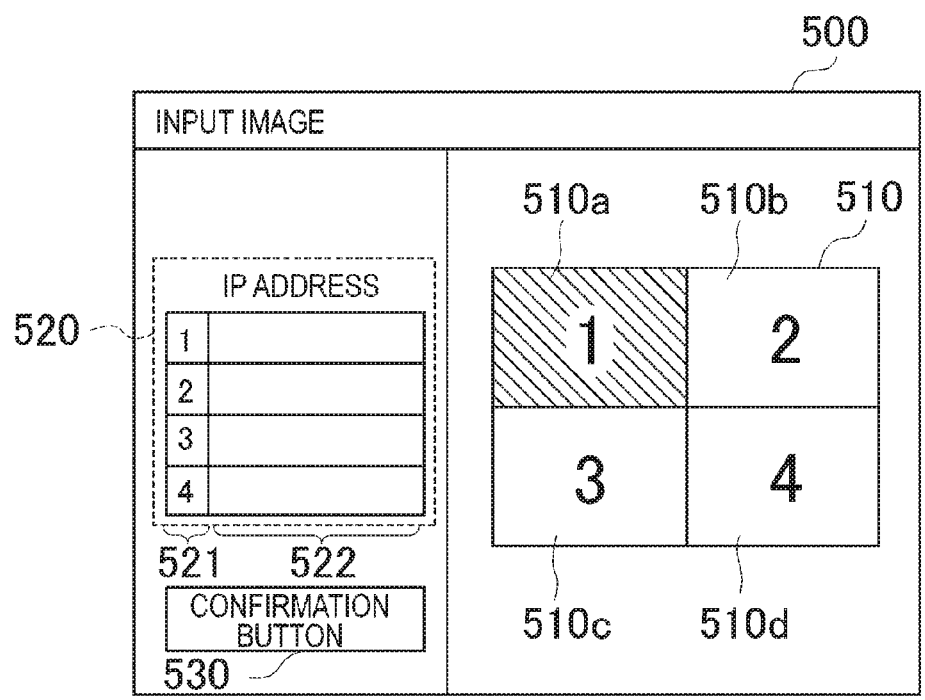
FIGS. 5A and 5B are diagrams illustrating an example of an input image in the first to the third embodiments.

For example, when the display pattern 402 is selected in S303, the projection unit 111a projects the input image 500 illustrated in FIG. 5A onto the screen in S304.

The input image 500 illustrated in FIG. 5A will be described. The input image 500 illustrated in FIG. 5A includes an area 510, an area 520, and a confirmation button 530. The area 510 is an area where the display pattern 402 selected in S302 is displayed. The area 520 includes an area 521 where identification information for identifying positions of predetermined areas 510a to 510d included in the display pattern 402 is displayed and an input field 522. The display pattern 402 displayed in the area 510 includes the predetermined areas 510a to 510d, so that pieces of identification information "1" to "4" for identifying the positions of the predetermined areas 510a to 510d are displayed in the area 521. The input field 522 is an input field where IP addresses of the projectors are inputted with respect to the identification information "1" to "4" displayed in the area 521. The IP address is identification information for identifying each of the projectors 100a to 100d in a network for implementing the multiple projection system.

Next, the area 521 and the input field 522 will be described with reference to FIG. 5B. The area 521 includes areas 521a to 521d. The input field 522 includes input fields 522a to 522d. In the area 521a, the identification information "1" for identifying the position of the predetermined area 510a is displayed. The input field 522a is an input field into which the user is caused to input an IP address of a projector that projects an image to the position of the predetermined area 510a. The IP address inputted into the input field 522a is associated with the predetermined area 510a and the identification information "1".

In the area 521b, the identification information "2" for identifying the position of the predetermined area 510b is displayed. The input field 522b is an input field into which the user is caused to input an IP address of a projector that projects an image to the position of the predetermined area 510b. The IP address inputted into the input field 522b is associated with the predetermined area 510b and the identification information "2".

In the area 521c, the identification information "3" for identifying the position of the predetermined area 510c is displayed. The input field 522c is an input field into which the user is caused to input an IP address of a projector that projects an image to the position of the predetermined area 510c. The IP address inputted into the input field 522c is associated with the predetermined area 510c and the identification information "3".

In the area 521d, the identification information "4" for identifying the position of the predetermined area 510d is displayed. The input field 522d is an input field into which the user is caused to input an IP address of a projector that projects an image to the position of the predetermined area 510d. The IP address inputted into the input field 522d is associated with the predetermined area 510d and the identification information "4".

To display an image on the screen according to the display pattern 402, it is necessary to assign IP addresses of projectors to the predetermined areas 510a to 510d. Therefore, the input image 500 is used to cause the user to input IP addresses into the input fields 522a to 522d.

In S304, the input image 500 illustrated in FIG. 5A is displayed on the screen by the projection unit 111a. Thereafter, the user inputs IP addresses into the input field 522 as illustrated in FIG. 5B by using at least either one of the operation key 107a and the remote control unit 109a. In the first embodiment, the IP address of the projector 100a is "192.168.254.1" and the IP address of the projector 100b is "192.168.254.2". Further, in the first embodiment, the IP address of the projector 100c is "192.168.254.3" and the IP address of the projector 100d is "192.168.254.4".

In a state in which the input image 500 illustrated in FIG. 5A is displayed on the screen, the user can input the IP addresses of the projectors into the input field 522 while confirming the positions where the projectors 100a to 100d are installed, the area 510, and the area 521. In the first embodiment, it is assumed that the IP address of the projector 100a, which is the master device, is inputted into the input field 522a in advance even when the user does not input the IP address.

For example, a case in which the state where the projectors 100a to 100d are installed as illustrated in FIG. 1 will be described. In this case, the user should input the IP address of the projector 100b into the input field 522b. Further, the user should input the IP address of the projector 100c into the input field 522c. Further, the user should input the IP address of the projector 100d into the input field 522d.

Figure 6:
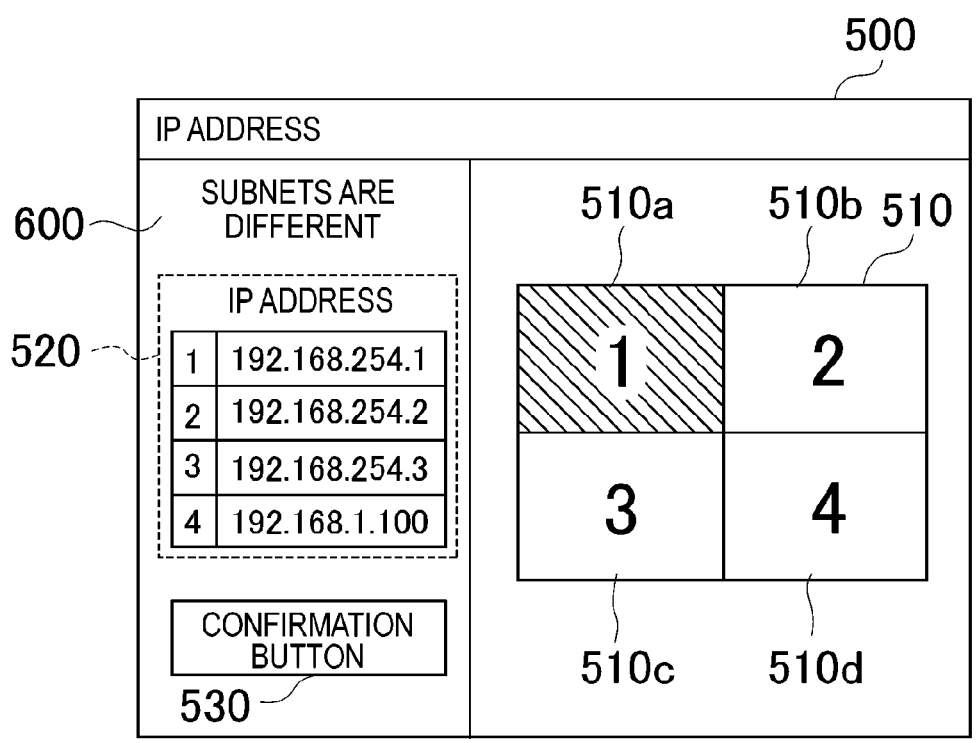
FIG. 6 is a diagram illustrating an example of an input image in the first to the third embodiments.

Further, the CPU 101a monitors a subnet of the IP addresses inputted into the input field 522. When the CPU 101a receives input of a plurality of IP addresses of which subnets are different through the user IF 106a, the CPU 101a controls the projection unit 111a so as to project information indicating that there is an error in the input of the IP addresses onto the screen. In this case, the information 600 such as "Subnets are different" as illustrated in FIG. 6 is projected by the projection unit 111a. Thereby, the user can recognize that there is an error in the input of the IP addresses. When the user inputs the IP addresses, the CPU 101a performs S305.

In S305, the CPU 101a sets projection positions of the projectors 100a to 100d according to the input into the input field 522 performed by the user.

For example, in the case of FIG. 5B, in S305, the IP address "192.168.254.1" inputted into the input field 522a is associated with the predetermined area 510a and the identification information "1". In this case, the CPU 101a sets the projection position, where the projector having the IP address "192.168.254.1" projects a partial image, to the position indicated by the identification information "1". Therefore, the CPU 101a stores first position information including the identification information "1" into the RAM 103a as information indicating the projection position of the projector having the IP address "192.168.254.1". The first position information may further include information indicating the area 510a.

For example, in the case of FIG. 5B, in S305, the IP address "192.168.254.2" inputted into the input field 522b is associated with the predetermined area 510b and the identification information "2". In this case, the CPU 101a sets the projection position, where the projector having the IP address "192.168.254.2" projects a partial image, to the position indicated by the identification information "2". Therefore, the CPU 101a stores second position information including the identification information "2" into the RAM 103a as information indicating the projection position of the projector having the IP address "192.168.254.2". The second position information may further include information indicating the predetermined area 510b.

For example, in the case of FIG. 5B, in S305, the IP address "192.168.254.3" inputted into the input field 522c is associated with the predetermined area 510c and the identification information "3". In this case, the CPU 101a sets the projection position, where the projector having the IP address "192.168.254.3" projects a partial image, to the position indicated by the identification information "3". Therefore, the CPU 101a stores third position information including the identification information "3" into the RAM 103a as information indicating the projection position of the projector having the IP address "192.168.254.3". The third position information may further include information indicating the predetermined area 510c.

For example, in the case of FIG. 5B, in S305, the IP address "192.168.254.4" inputted into the input field 522d is associated with the predetermined area 510d and the identification information "4". In this case, the CPU 101a sets the projection position, where the projector having the IP address "192.168.254.4" projects a partial image, to the position indicated by the identification information "4". Therefore, the CPU 101a stores fourth position information including the identification information "4" into the RAM 103a as information indicating the projection position of the projector having the IP address "192.168.254.4". The fourth position information may further include information indicating the predetermined area 510d.

When the user presses the confirmation button 530 by using at least either one of the operation key 107a and the remote control unit 109a, the CPU 101a performs S306. When the confirmation button 530 is pressed, the assignment of the IP addresses by using the input image 500 is completed.

In S306, the CPU 101a transmits the position information recorded in the RAM 103a to the projectors 100b to 100d, which are slave devices, through the network IF 105a.

For example, in S306, the CPU 101a transmits the first position information to the projector having the IP address "192.168.254.1". Further, in S306, the CPU 101a transmits the second position information to the projector having the IP address "192.168.254.2". Further, in S306, the CPU 101a transmits the third position information to the projector having the IP address "192.168.254.3". Further, in S306, the CPU 101a transmits the fourth position information to the projector having the IP address "192.168.254.4". After all the position information recorded in the RAM 103a is transmitted, the CPU 101a performs S307.

In S307, the CPU 101a controls the projection unit 111a so as to project an image 700a. The image 700a is an image for notifying of the display pattern selected in S303 and the projection position of the projector 100a.

Figure 7:
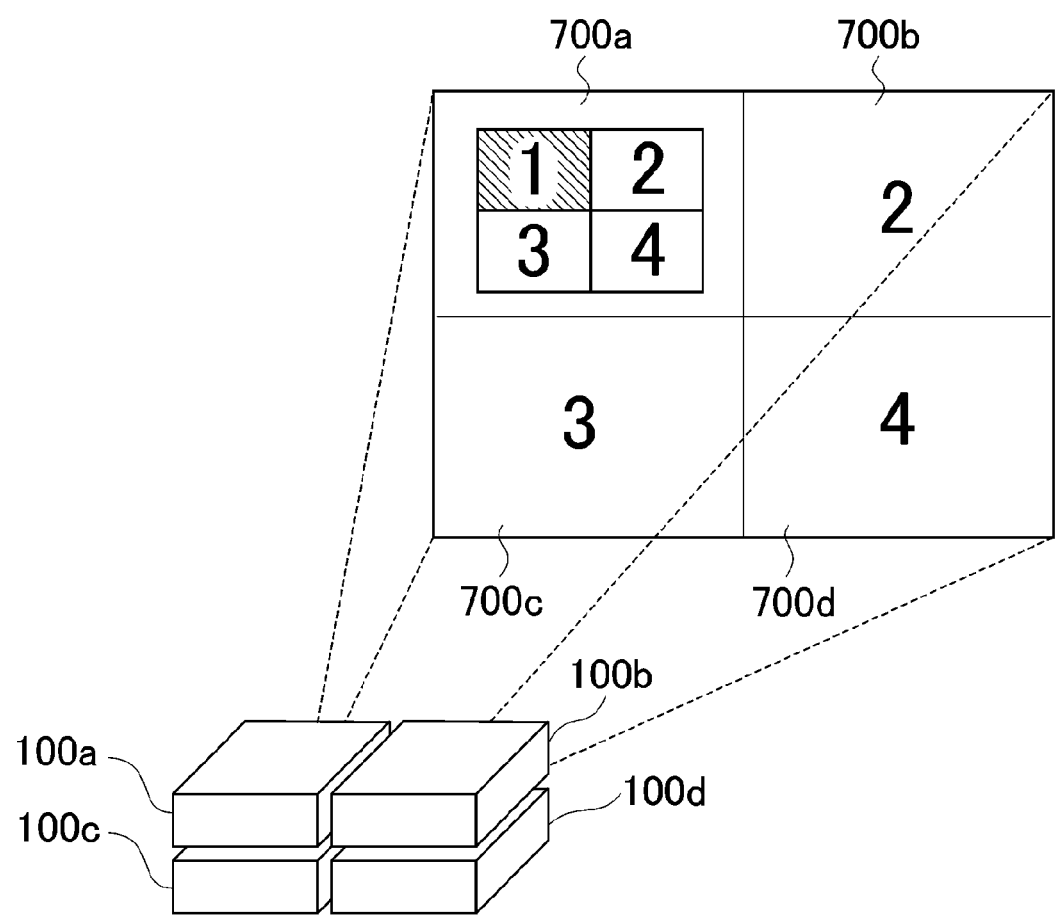
FIG. 7 is a diagram illustrating an example of an image projected by the multiple projection system in the first embodiment.

When the display pattern 402 is selected in S303, the image 700a in FIG. 7 is projected onto the screen by the projection unit 111a. The image 700a includes an image representing the selected display pattern 402 and information (diagonal lines in the image 700a) indicating that the projection position of the projector 100a is a position corresponding to the identification information "1".

When the projector 100b receives the position information transmitted from the projector 100a in S306, the projector 100b performs S322. In S322, the CPU 101b controls the image processing unit 104b so as to generate an image for notifying a position indicated by the position information received from the projector 100a. Thereafter, the CPU 101b controls the projection unit 111b so as to project the image generated by the image processing unit 104b to the position indicated by the position information received from the projector 100a.

For example, when the IP address of the projector 100b is inputted into the input field 522b by the user, the projector 100b receives the second position information from the projector 100a. Therefore, in S322, an image 700b is projected on the screen by the projection unit 111b. The image 700b is an image for notifying of a position indicated by the second position information. The image 700b includes information indicating the identification information "2" ("2" in the image 700b) included in the second position information.

While the operation in which the projector 100b performs S322 has been described, the projectors 100c and 100d also perform the same operation as that performed by the projector 100b.

For example, when the IP address of the projector 100c is inputted into the input field 522c by the user, the projector 100c receives the third position information from the projector 100a. Therefore, in S322, an image 700c is projected on the screen by the projection unit 111c. The image 700c is an image for notifying of a position indicated by the third position information. The image 700c includes information indicating the identification information "3" ("3" in the image 700c) included in the third position information.

For example, when the IP address of the projector 100d is inputted into the input field 522d by the user, the projector 100d receives the fourth position information from the projector 100a. Therefore, in S322, an image 700d is projected on the screen by the projection unit 111d. The image 700d is an image for notifying of a position indicated by the fourth position information. The image 700d includes information indicating the identification information "4" ("4" in the image 700d) included in the fourth position information.

When S307 is performed by the projector 100a and S322 is performed by the projectors 100b to 100d, the images 700a to 700d are displayed on the screen as illustrated in FIG. 7. In this case, by checking the image 700a, the user can identify the display pattern that is currently set and the projection position of the projector 100a. Further, by checking the images 700a to 700d, the user can compare the display pattern that is currently set with the projection positions of the projectors 100b to 100d that are currently installed. Thereby, the user can easily determine whether or not the IP addresses of the projectors 100b to 100d and the positional relationship between the projectors 100b to 100d are correctly associated with each other. When the images 700b to 700d as illustrated in FIG. 7 are displayed on the screen, the display pattern displayed in the image 700a corresponds to the positions notified by the images 700b to 700d. Therefore, the user can determine that the IP addresses of the projectors 100b to 100d and the positional relationship between the projectors 100b to 100d are correctly associated with each other.

When all the IP addresses of the projectors 100b to 100d are correctly inputted in the input field 522 as illustrated in FIG. 5B, the images 700b to 700d as illustrated in FIG. 7 are displayed on the screen by performing S307 and S322.

Figure 8A:
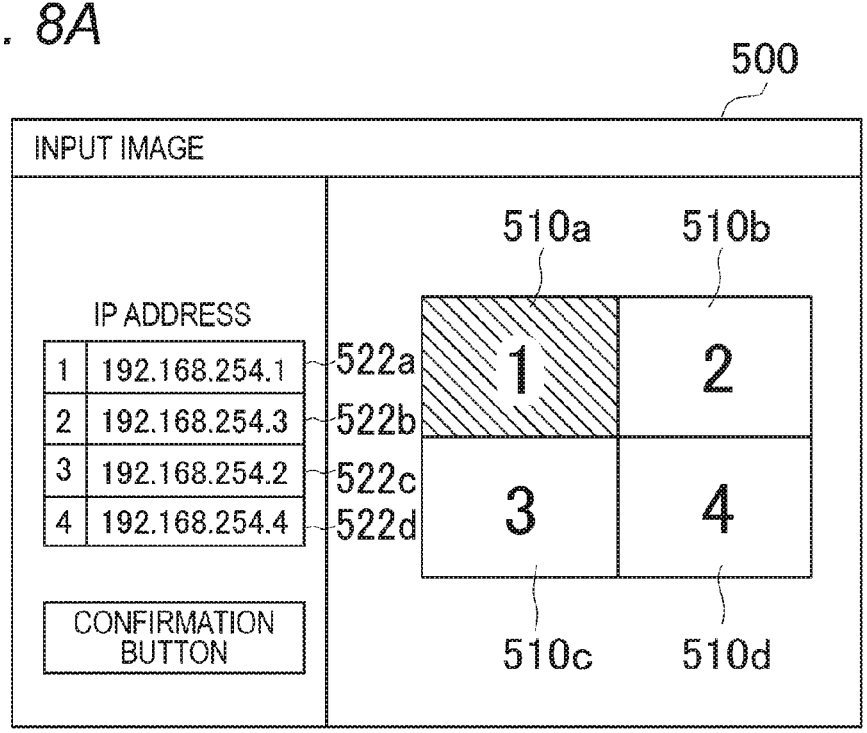
FIGS. 8A and 8B are diagrams illustrating an example of an input image in the first to the third embodiments.
Figure 8B:
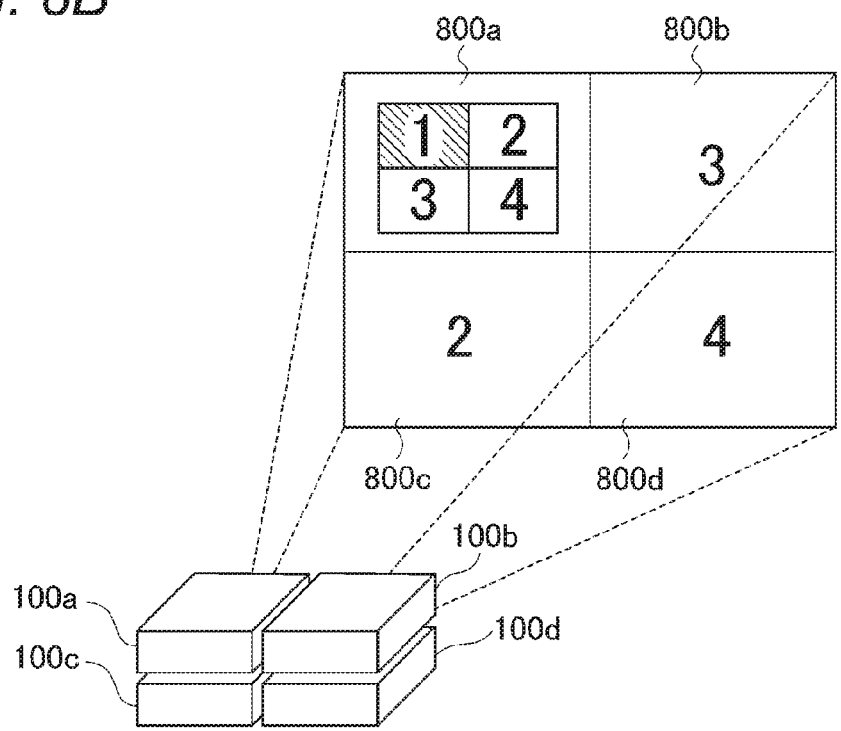

However, there is a case in which the IP addresses of the projectors 100b to 100d are not correctly inputted in the input field 522. This case will be described with reference to FIG. 8A. FIG. 8A illustrates a case in which the IP address of the projector 100c is inputted in the input field 522b and the IP address of the projector 100b is inputted in the input field 522c. In this case, it is difficult for the user to recognize that there is an error in the input of the IP addresses of the projector 100b and the projector 100c. However, in this case, when S307 is performed by the projector 100a and S322 is performed by the projectors 100b to 100d, images 800a to 800d are displayed on the screen as illustrated in FIG. 8B. The image 800a is an image projected onto the screen by the projection unit 111a in S307 when the input of the IP addresses is as illustrated in FIG. 8A. The image 800a is the same image as the image 700a. The image 800b is an image projected onto the screen by the projection unit 111b in S322 when the input of the IP addresses is as illustrated in FIG. 8A. The image 800c is an image projected onto the screen by the projection unit 111c in S322 when the input of the IP addresses is as illustrated in FIG. 8A. The image 800d is an image projected onto the screen by the projection unit 111d in S322 when the input of the IP addresses is as illustrated in FIG. 8A.

In this case, by checking the image 800a, the user can identify the display pattern that is currently set and the projection position of the projector 100a. Further, by checking the images 800a to 800d, the user can compare the display pattern that is currently set with the projection positions of the projectors 100b to 100d that are currently installed. Thereby, the user can easily determine whether or not the IP addresses of the projectors 100b to 100d and the positional relationship between the projectors 100b to 100d are correctly associated with each other. When the images 800a to 800d as illustrated in FIG. 8B are displayed on the screen, the display pattern displayed in the image 800a does not correspond to the positions notified by the images 800b to 800d. Therefore, the user can determine that the IP addresses of the projectors 100b to 100d and the positional relationship between the projectors 100b to 100d are not correctly associated with each other.

When the images 800a to 800d as illustrated in FIG. 8B are displayed, the user can recognize that there is an error in the input of the IP address of the projector 100b and the IP address of the projector 100c. In this case, the user can correct the error in the input of the IP addresses by using at least either one of the operation key 107a and the remote control unit 109a.

When the user performs an operation to correct the input of the IP addresses by using at least either one of the operation key 107a and the remote control unit 109a, a correction instruction to correct the input of the IP addresses is inputted into the CPU 101a through the user IF 106a. In S308, the CPU 101a determines whether or not the correction instruction is inputted through the user IF 106a. When the correction instruction is inputted (Yes in S308), the CPU 101a performs S304 to S307 again. When the correction instruction is not inputted (No in S308), the CPU 101a performs S309.

When the correction instruction is not inputted (No in S308), the CPU 101a determines that the IP addresses of the projectors 100b to 100d and the positional relationship between the projectors 100b to 100d are correctly associated with each other and performs S309. When the correction instruction is not inputted (No in S308), the user can issue a projection instruction to the projector 100a by using at least either one of the operation key 107a and the remote control unit 109a. The projection instruction is an instruction to start processing to display an image on the screen by the multiple projection system.

In S309, the CPU 101a determines whether or not the projection instruction is inputted through the user IF 106a. When the projection instruction is inputted (Yes in S309), the CPU 101a performs S310. When the projection instruction is not inputted (No in S309), the CPU 101a returns to S308.

In S310, the CPU 101a connects to the projectors 100b to 100d through the network IF 105a based on the IP addresses inputted into the input image 500.

After S310 is performed, the CPU 101a requests the projectors 100b to 100d to transmit resolution information representing the resolution of an image projected by each of the projectors 100b to 100d to the projector 100a. Thereafter, in S323, the projector 100b transmits the resolution information representing the resolution of the partial image projected by the projector 100b to the projector 100a through the network IF 105b. The projectors 100c and 100d also perform the same operation as that of the projector 100b in S323. The CPU 101a stores the resolution information received through the network IF 105a into the RAM 103a. Thereafter, the CPU 101a requests the projectors 100b to 100d to transmit area information representing a position of an overlapping area of an image projected by each of the projectors 100b to 100d to the projector 100a.

The overlapping area of the projector 100b is a part of the image projected by the projector 100b and the part overlaps with a part of images projected by projectors other than the projector 100b. The size and the position of the overlapping area of the projector 100b is set by the user. The light reduction processing is performed on the overlapping area of the projector 100b by the image processing unit 104b.

When the upper side of the image projected by the projector 100b overlaps with a part of an image projected by projectors other than the projector 100b, the area information of the projector 100b includes information indicating that the overlapping area of the projector 100b is located upward. When the right side of the image projected by the projector 100b overlaps with a part of an image projected by projectors other than the projector 100b, the area information of the projector 100b includes information indicating that the overlapping area of the projector 100b is located rightward. When the lower side of the image projected by the projector 100b overlaps with a part of an image projected by projectors other than the projector 100b, the area information of the projector 100b includes information indicating that the overlapping area of the projector 100b is located downward. When the left side of the image projected by the projector 100b overlaps with a part of an image projected by projectors other than the projector 100b, the area information of the projector 100b includes information indicating that the overlapping area of the projector 100b is located leftward.

In S324, the CPU 101b transmits the area information indicating the position of the overlapping area of the projector 100b to the projector 100a through the network IF 105b according to the request from the projector 100a. The projectors 100c and 100d also perform the same operation as that of the projector 100b in S324. The CPU 101a stores the area information received through the network IF 105a into the RAM 103a.

It is assumed that the resolution information of the projector 100a and the area information of the projector 100a are stored in the RAM 103a.

When all the resolution information and all the area information are acquired, the CPU 101a performs S311. In S311, the CPU 101a calculates the size of the entire image displayed on the screen by using the resolution information of the projectors 100a to 100d and the area information of the projectors 100a to 100d. The entire image is an image obtained by combining the partial image 210a, the partial image 210b, the partial image 210c, and the partial image 210d, which are illustrated in FIG. 1. Further, the CPU 101a calculates coordinates indicating an area of the partial image projected by each of the projectors 100a to 100d in the image 200 based on the size of the entire image, the ratio of the image 200, and the display pattern selected in S303.

For example, in S311, the CPU 101a calculates coordinates indicating the area of the partial image of the projector 100a as first coordinate information. Further, the CPU 101a calculates coordinates indicating the area of the partial image of the projector 100b as second coordinate information. Further, the CPU 101a calculates coordinates indicating the area of the partial image of the projector 100c as third coordinate information. Further, the CPU 101a calculates coordinates indicating the area of the partial image of the projector 100d as fourth coordinate information. The CPU 101a stores the first coordinate information, the second coordinate information, the third coordinate information, and the fourth coordinate information, which are acquired, into the RAM 103a. When the first coordinate information, the second coordinate information, the third coordinate information, and the fourth coordinate information are calculated, the CPU 101a performs S312.

In S312, the CPU 101a transmits coordinate information and the image 200 to the projectors 100b to 100d through the network IF 105a.

For example, in S312, the CPU 101a transmits the second coordinate information and the image 200 to the projector 100b. Further, the CPU 101a transmits the third coordinate information and the image 200 to the projector 100c. Further, the CPU 101a transmits the fourth coordinate information and the image 200 to the projector 100d. After the second coordinate information, the third coordinate information, and the fourth coordinate information are transmitted, the CPU 101a performs S313.

In S313, the CPU 101a reads the first coordinate information from the RAM 103a. Thereafter, the CPU 101a controls the image processing unit 104a so as to generate the partial image 210a, which is an image to be projected by the projection unit 111a, based on the image 200 and the first coordinate information. Further, the CPU 101a controls the image processing unit 104a so as to perform the light reduction processing on the overlapping area in the partial image 210a generated by the image processing unit 104a. Then, the CPU 101a controls the projection unit 111a so as to project the partial image 210a on which the light reduction processing has been performed. In S313, the projection unit 111a projects the partial image 210a, so that the partial image 210a is displayed on the screen as illustrated in FIG. 1. After the partial image is projected by the projection unit 111a, the CPU 101a performs S314. The user can issue a projection end instruction to the projector 100a by using at least either one of the operation key 107a and the remote control unit 109a. The projection end instruction is an instruction to end the processing to display an image on the screen by the multiple projection system.

Therefore, in S314, the CPU 101a determines whether or not the projection end instruction is inputted. When the projection end instruction is inputted (Yes in S314), the CPU 101a ends the projection processing. When the projection end instruction is not inputted (No in S314), the CPU 101a returns to S312 and the projection unit 111a continuously performs projection of the partial image 210a.

After S312 is performed, when the CPU 101b receives the second coordinate information and the image 200 from the projector 100a, the CPU 101b performs S325. In S325, the CPU 101b controls the image processing unit 104b so as to generate the partial image 210b, which is an image to be projected by the projection unit 111b, based on the image 200 and the second coordinate information. Further, the CPU 101b controls the image processing unit 104b so as to perform the light reduction processing on the overlapping area in the partial image 210b generated by the image processing unit 104b. Then, the CPU 101b controls the projection unit 111b so as to project the partial image 210b on which the light reduction processing has been performed. In S325, the projection unit 111b projects the partial image 210b, so that the partial image 210b is displayed on the screen as illustrated in FIG. 1. After the partial image is projected by the projection unit 111b, the CPU 101b performs S326.

While the operation in which the projector 100b performs S325 has been described, the projectors 100c and 100d also perform, in S325, the same operation as that performed by the projector 100b.

The user can issue the projection end instruction to the projector 100b by using at least either one of the operation key 107b and the remote control unit 109b. Therefore, in S326, the CPU 101b determines whether or not the projection end instruction is inputted. When the projection end instruction is inputted (Yes in S326), the CPU 101b ends the projection processing. When the projection end instruction is not inputted (No in S326), the CPU 101b returns to S325 and the projection unit 111b continuously performs projection of the partial image 210b.

While the operation in which the projector 100b performs S326 has been described, the projectors 100c and 100d also perform, in S326, the same operation as that performed by the projector 100b.

S301 to S314 are processing realized when the CPU 101a of the projector 100a, which is the master device, executes a computer program stored in the ROM 102a. S321 to S326 are processing realized when the CPU 101b of the projector 100b, which is the slave device, executes a computer program stored in the ROM 102b. S321 to S326 are processing realized when the CPU 101c of the projector 100c, which is the slave device, executes a computer program stored in the ROM 102c. S321 to S326 are processing realized when the CPU 101d of the projector 100d, which is the slave device, executes a computer program stored in the ROM 102d.

In the first embodiment, it is described that the display patterns that can be selected by using the selection image 400 are the display patterns 401 to 404. However, the display patterns are not limited to these patterns. For example, the display patterns that can be selected by using the selection image 400 may further include display patterns other than the display patterns 401 to 404.

In the first embodiment, in the multiple projection system, the master device projects an image for notifying of the display pattern selected by the user and the projection position of the image to be projected by the master device. The slave device projects an image for notifying of the projection position of the image to be projected by the slave device. Thereby, the user can confirm the selected display pattern and the projection positions of the images to be projected by the slave devices that are currently set. For example, when the positions indicated by the images projected by the slave devices do not correspond to the positions illustrated in the display pattern included in the image projected by the master device, the user can determine that there is an error in the input of the IP addresses of the slave devices. In this case, the user can easily determine that the positions associated with the IP addresses of the slave devices do not correspond to the current installation positions of the slave devices, so that the user can correctly modify the input of the IP addresses of the slave devices.

Therefore, in the multiple projection system of the first embodiment, it is possible to cause the user to easily determine whether the association between the IP addresses of the slave devices and the positional relationship of the slave devices is correct or not.

Figure 9:
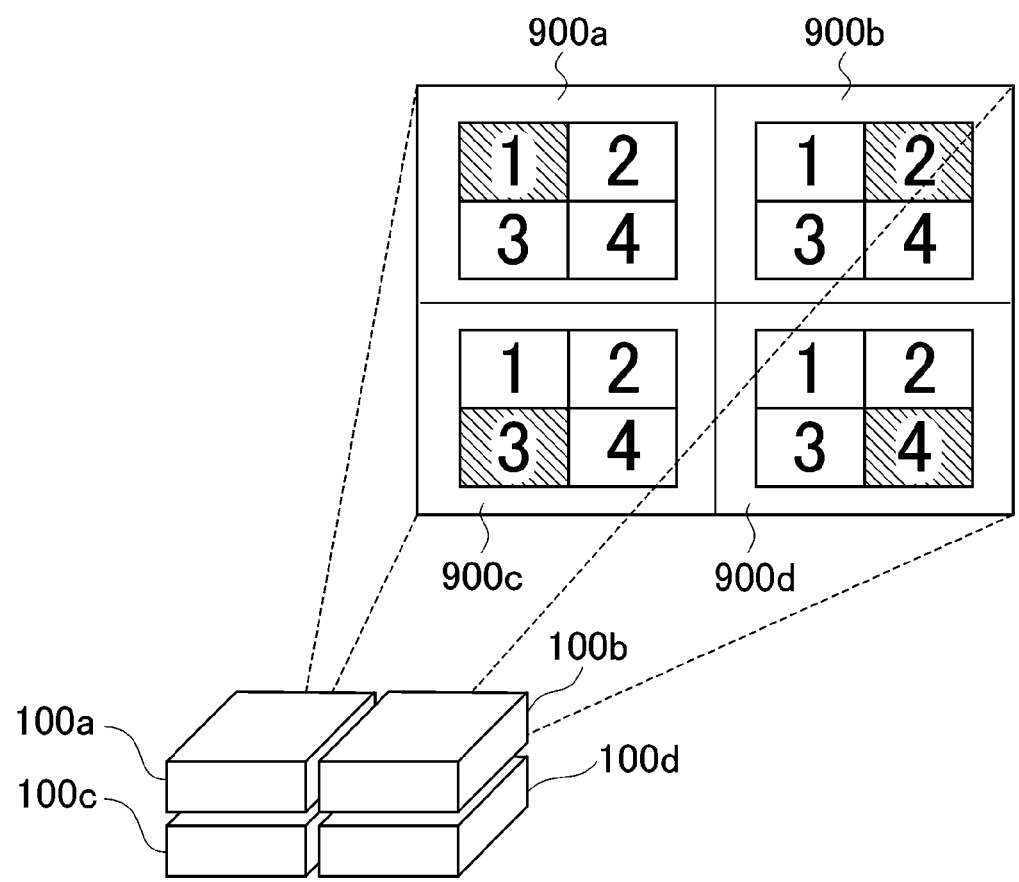
FIG. 9 is a diagram illustrating an example of an image projected by the multiple projection system in the first embodiment.

In the first embodiment, it is described that when S307 is performed by the master device and S322 is performed by the slave devices, in the multiple projection system, images such as the images 700a to 700d as illustrated in FIG. 7 are displayed on the screen. However, it is not limited to this. For example, in the first embodiment, when S307 is performed by the master device and S322 is performed by the slave devices, in the multiple projection system, images such as the images 900a to 900d as illustrated in FIG. 9 may be displayed on the screen.

In this case, in S306, the projector 100a transmits position information to the projectors 100b to 100d and transmits information representing the display pattern selected in S303 to the projectors 100b to 100d. Further, in S307, the projector 100a controls the projection unit 111a so as to project the image 900a instead of the image 700a. In S322, the projector 100b controls the image processing unit 104b so as to generate the image 900b based on the position information and the information representing the display pattern which are received from the projector 100a. Further, the projector 100b controls the projection unit 111b so as to project the image 900b based on the position information received from the projector 100a. In the same manner as the projector 100b, in S322, the projector 100c controls the projection unit 111c so as to project the generated image 900c based on the position information and the information representing the display pattern which are received from the projector 100a. In the same manner as the projector 100b, in S322, the projector 100d controls the projection unit 111d so as to project the generated image 900d based on the position information and the information representing the display pattern which are received from the projector 100a.

Second Embodiment

Next, a multiple projection system in the second embodiment will be described. In the second embodiment, the description of the same configuration and processing as those in the first embodiment will be omitted.

Figure 10:
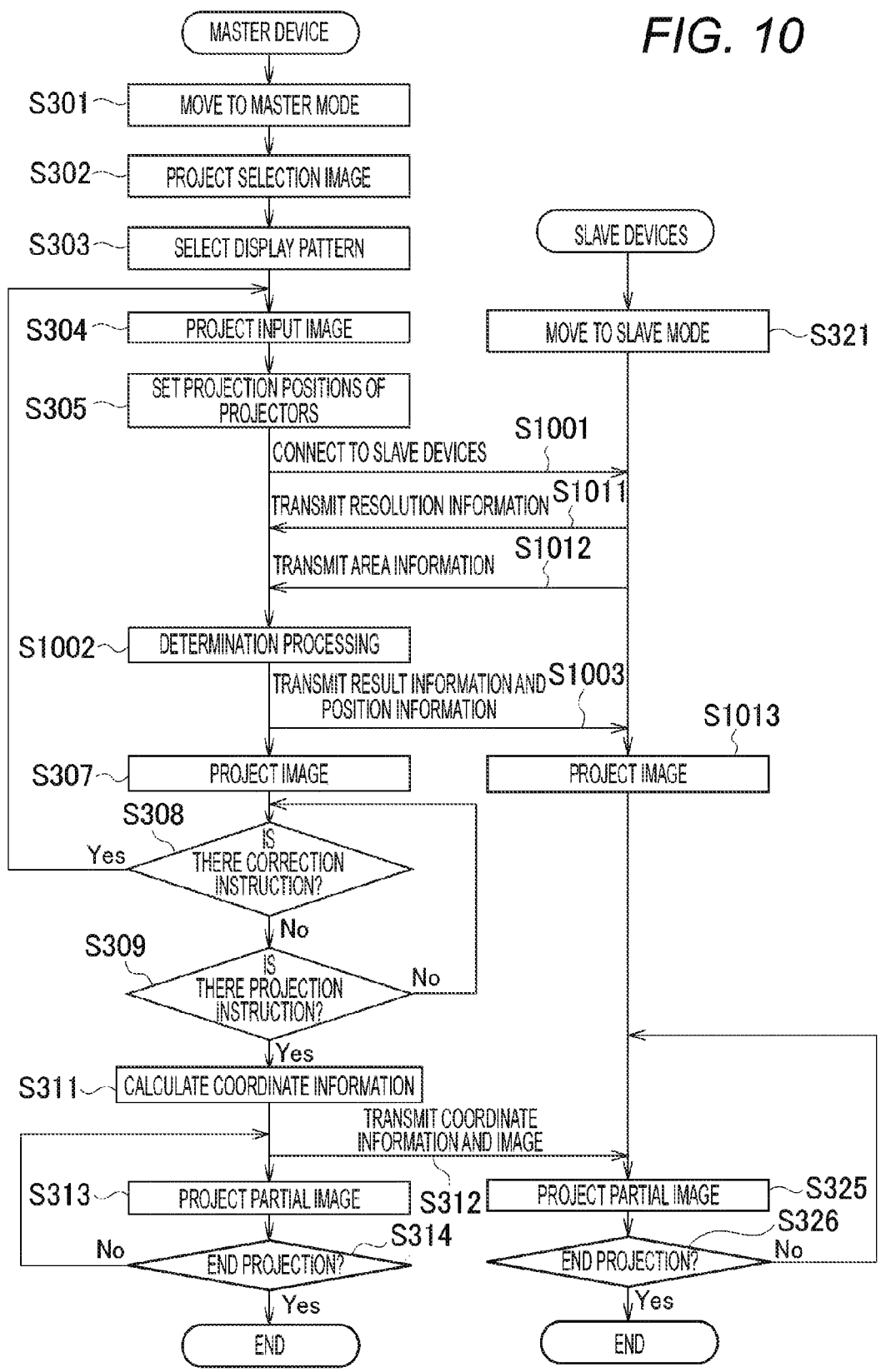
FIG. 10 is a sequence diagram illustrating an example of projection processing in the second embodiment.

FIG. 10 is a sequence diagram illustrating an example of projection processing performed by the multiple projection system in the second embodiment.

S301 to S305, S307 to S314, S321, S325, and S326 in the projection processing in FIG. 10 are the same processing as S301 to S305, S307 to S314, S321, S325, and S326 in the projection processing in FIG. 3, so that the description thereof will be omitted.

The projection processing illustrated in FIG. 10 will be described by using an example in which the projector 100a is set as a master device and the projectors 100b to 100d are set as slave devices. Further, the projection processing illustrated in FIG. 10 will be described by using an example in which the display pattern 402 is selected in S303.

After performing S305, the CPU 101a performs S1001. In S1001, in the same manner as in S310 in FIG. 3, the CPU 101a connects to the projectors 100b to 100d through the network IF 105a based on the IP addresses inputted by the user in S304.

After S1001 is performed, the CPU 101a requests the projectors 100b to 100d to transmit resolution information representing the resolution of an image projected by each of the projectors 100b to 100d to the projector 100a. Thereafter, in the same manner as in S323 in FIG. 3, in S1011, the CPU 101b transmits the resolution information representing the resolution of the image projected by the projector 100b to the projector 100a through the network IF 105b. The projectors 100c and 100d also perform the same operation as that of the projector 100b in S1011. The CPU 101a stores the resolution information received through the network IF 105a into the RAM 103a. Thereafter, the CPU 101a requests the projectors 100b to 100d to transmit area information indicating an overlapping area of an image projected by each of the projectors 100b to 100d to the projector 100a. In the same manner as in S324 in FIG. 3, in S1012, the CPU 101b transmits the area information indicating the overlapping area of the projector 100b to the projector 100a through the network IF 105b according to the request from the projector 100a. The projectors 100c and 100d also perform the same operation as that of the projector 100b in S1012. The CPU 101a stores the area information received through the network IF 105a into the RAM 103a.

When all the resolution information and all the area information are acquired, the CPU 101a performs S1002. In S1002, the CPU 101a performs determination processing to determine whether or not the setting performed in S305 is correct by using all the acquired area information.

As the determination processing, the CPU 101a performs first processing, second processing, third processing, and fourth processing.

The first processing is processing for determining whether the association between the predetermined area 510a and the IP address inputted into the input field 522a is correct or not. The CPU 101a acquires first information indicating the position of the overlapping area included in the predetermined area 510a from the RAM 103a. The first information is stored in the RAM 103a in advance. The right side of the image projected onto the predetermined area 510a overlaps with a part of the image projected onto the predetermined area 510b, so that the first information includes information indicating that the overlapping area included in the predetermined area 510a is located rightward. Further, the lower side of the image projected onto the predetermined area 510a overlaps with a part of the image projected onto the predetermined area 510c, so that the first information includes information indicating that the overlapping area included in the predetermined area 510a is located downward.

The CPU 101a compares the first information with the area information acquired from the projector having the IP address inputted into the input field 522a, and determines whether the association between the predetermined area 510a and the IP address inputted into the input field 522a is correct or not according to the comparison result. When the first information corresponds with the area information acquired from the projector having the IP address inputted into the input field 522a, the CPU 101a determines that the association between the predetermined area 510a and the IP address inputted into the input field 522a is correct. When the first information does not correspond with the area information acquired from the projector having the IP address inputted into the input field 522a, the CPU 101a determines that the association between the predetermined area 510a and the IP address inputted into the input field 522a is not correct.

The second processing is processing for determining whether the association between the predetermined area 510b and the IP address inputted into the input field 522b is correct or not. The CPU 101a acquires second information indicating the position of the overlapping area included in the predetermined area 510b from the RAM 103a. The second information is stored in the RAM 103a in advance. The left side of the image projected onto the predetermined area 510b overlaps with a part of the image projected onto the predetermined area 510a, so that the second information includes information indicating that the overlapping area included in the predetermined area 510b is located leftward. Further, the lower side of the image projected onto the predetermined area 510b overlaps with a part of the image projected onto the predetermined area 510d, so that the second information includes information indicating that the overlapping area included in the predetermined area 510b is located downward.

The CPU 101a compares the second information with the area information acquired from the projector having the IP address inputted into the input field 522b, and determines whether the association between the predetermined area 510b and the IP address inputted into the input field 522b is correct or not according to the comparison result. When the second information corresponds with the area information acquired from the projector having the IP address inputted into the input field 522b, the CPU 101a determines that the association between the predetermined area 510b and the IP address inputted into the input field 522b is correct. When the second information does not correspond with the area information acquired from the projector having the IP address inputted into the input field 522b, the CPU 101a determines that the association between the predetermined area 510b and the IP address inputted into the input field 522b is not correct.

The third processing is processing for determining whether the association between the predetermined area 510c and the IP address inputted into the input field 522c is correct or not. The CPU 101a acquires third information indicating the position of the overlapping area included in the predetermined area 510c from the RAM 103a. The third information is stored in the RAM 103a in advance. The upper side of the image projected onto the predetermined area 510c overlaps with a part of the image projected onto the predetermined area 510a, so that the third information includes information indicating that the overlapping area included in the predetermined area 510c is located upward. Further, the right side of the image projected onto the predetermined area 510c overlaps with a part of the image projected onto the predetermined area 510d, so that the third information includes information indicating that the overlapping area included in the predetermined area 510c is located rightward.

The CPU 101a compares the third information with the area information acquired from the projector having the IP address inputted into the input field 522c, and determines whether the association between the predetermined area 510c and the IP address inputted into the input field 522c is correct or not according to the comparison result. When the third information corresponds with the area information acquired from the projector having the IP address inputted into the input field 522c, the CPU 101a determines that the association between the predetermined area 510c and the IP address inputted into the input field 522c is correct. When the third information does not correspond with the area information acquired from the projector having the IP address inputted into the input field 522c, the CPU 101a determines that the association between the predetermined area 510c and the IP address inputted into the input field 522c is not correct.

The fourth processing is processing for determining whether the association between the predetermined area 510d and the IP address inputted into the input field 522d is correct or not. The CPU 101a acquires fourth information indicating the position of the overlapping area included in the predetermined area 510d from the RAM 103a. The fourth information is stored in the RAM 103a in advance. The upper side of the image projected onto the predetermined area 510d overlaps with a part of the image projected onto the predetermined area 510b, so that the fourth information includes information indicating that the overlapping area included in the predetermined area 510d is located upward. Further, the left side of the image projected onto the predetermined area 510d overlaps with a part of the image projected onto the predetermined area 510c, so that the fourth information includes information indicating that the overlapping area included in the predetermined area 510d is located leftward.

The CPU 101a compares the fourth information with the area information acquired from the projector having the IP address inputted into the input field 522d, and determines whether the association between the predetermined area 510d and the IP address inputted into the input field 522d is correct or not according to the comparison result. When the fourth information corresponds with the area information acquired from the projector having the IP address inputted into the input field 522d, the CPU 101a determines that the association between the predetermined area 510d and the IP address inputted into the input field 522d is correct. When the fourth information does not correspond with the area information acquired from the projector having the IP address inputted into the input field 522d, the CPU 101a determines that the association between the predetermined area 510d and the IP address inputted into the input field 522d is not correct.

When the determination processing is performed in S1002, the CPU 101a determines whether the association between the predetermined area 510a and the IP address inputted into the input field 522a is correct or not. Further, the CPU 101a determines whether the association between the predetermined area 510b and the IP address inputted into the input field 522b is correct or not. Further, the CPU 101a determines whether the association between the predetermined area 510c and the IP address inputted into the input field 522c is correct or not. Further, the CPU 101a determines whether the association between the predetermined area 510d and the IP address inputted into the input field 522d is correct or not. After S1002 is performed, the CPU 101a performs S1003.

In S1003, the CPU 101a transmits result information indicating the determination result of the determination processing in S1002 and the position information recorded in the RAM 103a to the projectors 100b to 100d through the network IF 105a.

S1003 performed by the CPU 101a when it is determined that, for example, the association between the predetermined area 510b and the IP address inputted into the input field 522b is not correct will be described. In this case, in S1003, the CPU 101a transmits the result information and the second position information to the projector having the IP address inputted into the input field 522b. The result information is information indicating that there is an error in the input of the IP address.

Further, S1003 performed by the CPU 101a when it is determined that, for example, the association between the predetermined area 510b and the IP address inputted into the input field 522b is correct will be described. In this case, in S1003, the CPU 101a transmits the result information and the second position information to the projector having the IP address inputted into the input field 522b. The result information is information indicating that the input of the IP address is correct. After S1003 is performed, the CPU 101a performs S307.

When the projector 100b receives the result information and the position information transmitted from the projector 100a in S1002, the projector 100b performs S1013. In S1013, the CPU 101b controls the image processing unit 104b so as to generate an image based on the position information and the result information received from the projector 100a.

Figure 11:
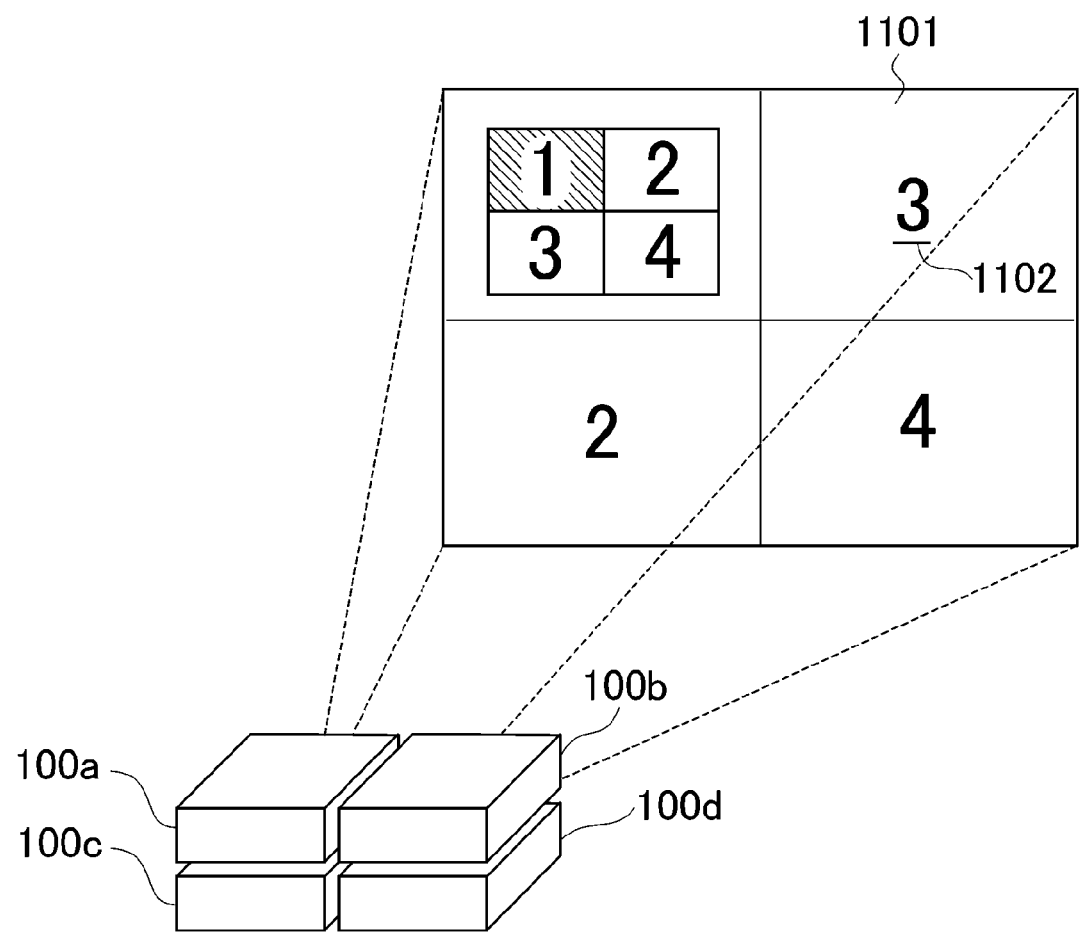
FIG. 11 is a diagram illustrating an example of an image projected by the multiple projection system in the second embodiment.

When the result information received from the projector 100a indicates that there is an error in the input of the IP address, the image processing unit 104b generates an image for notifying of the position indicated by the potion information and for notifying that there is an error in the input of the IP address. Thereafter, the CPU 101b controls the projection unit 111b so as to project the image generated by the image processing unit 104b to the position indicated by the position information received from the projector 100a. In this case, for example, as illustrated in FIG. 11, the projector 100b projects an image 1101 onto the screen. The image 1101 includes information 1102 indicating that there is an error in the input of the IP address.

When the result information received from the projector 100a indicates that the input of the IP address is correct, the image processing unit 104b generates an image for notifying of the position indicated by the potion information. Thereafter, the CPU 101b controls the projection unit 111b so as to project the image generated by the image processing unit 104b to the position indicated by the position information received from the projector 100a. When the result information received from the projector 100a indicates that the input of the IP address is correct, the projector 100b may control the projection unit 111b so as to project an image indicating that the input of the IP address is correct. In this case, the projection unit 111b projects an image indicating that the input of the IP address is correct at a position indicated by the position information received from the projector 100a.

While the operation of the projector 100b has been described, the projectors 100c and 100d also perform the same operation as that performed by the projector 100b. After S1013 is performed, the CPU 101b performs S325.

S1001 and S1002 are processing realized when the CPU 101a of the projector 100a, which is the master device, executes a computer program stored in the ROM 102a. S1011 to S1013 are processing realized when the CPU 101b of the projector 100b, which is the slave device, executes a computer program stored in the ROM 102b. S1011 to S1013 are processing realized when the CPU 101c of the projector 100c, which is the slave device, executes a computer program stored in the ROM 102c. S1011 to S1013 are processing realized when the CPU 101d of the projector 100d, which is the slave device, executes a computer program stored in the ROM 102d.

In the multiple projection system in the second embodiment, the master device projects an image for notifying of the display pattern selected by the user and the position of the image to be projected by the master device. Further, the slave device projects an image for notifying of the position of the image to be projected by the slave device.

In the second embodiment, the master device determines whether or not there is an error in the input of the IP address of the slave device based on the position of the overlapping area of the image projected by the slave device and notifies the slave device of the determination result. Further, when the slave device is notified by the master device that there is an error in the input of the IP address, the slave device projects an image for notifying information indicating that there is an error in the input of the IP address. Thereby, the user can easily determine that the position associated with the IP address of the slave device does not correspond to the current installation position of the slave device, so that the user can correctly modify the input of the IP address of the slave device.

Therefore, in the multiple projection system of the second embodiment, it is possible to cause the user to easily determine whether the association between the IP addresses of the slave devices and the positional relationship of the slave devices is correct or not.

It is assumed that the multiple projection system in the second embodiment has the same effect as that of the first embodiment regarding the same configuration and processing as those of the first embodiment.

In the second embodiment, the projector 100a notifies the projectors 100b to 100d of the determination result of the determination processing of S1002 and the projectors 100b to 100d project the determination result of the determination processing of S1002 which is notified from the master device. However, it is not limited to this.

For example, when the projector 100a receives all the area information, the projector 100a searches for information corresponding to the area information acquired from the projector having the IP address inputted into the input field 522b from among the first information, the second information, the third information, and the fourth information. Thereafter, the projector 100a changes the setting of the IP address corresponding to the predetermined area 510b according to the information corresponding to the area information acquired from the projector having the IP address inputted into the input field 522b. For example, when the IP address of the projector 100b is inputted into the input field 522b in S305, the projector 100a searches for information corresponding to the area information acquired from the projector 100b from among the first information, the second information, the third information, and the fourth information. When the information corresponding to the area information acquired from the projector 100b is the second information, the projector 100a determines that the association between the predetermined area 510b and the IP address inputted into the input field 522b is correct and then performs S1003. When the information corresponding to the area information acquired from the projector 100b is the third information, the projector 100a determines that the association between the predetermined area 510b and the IP address inputted into the input field 522b is not correct. Thereafter, the projector 100a changes the setting of the IP address of the projector 100b so that the IP address of the projector 100b is inputted into the input field 522c. Thereby, the predetermined area 510c and the IP address of the projector 100b inputted into the input field 522c is associated with each other. Thereafter, the projector 100a determines that the association between the predetermined area 510c and the IP address inputted into the input field 522c is correct and performs S1003. The projector 100a may also perform the same processing for the other predetermined areas 510a, 510c, and 510d.

Third Embodiment

Figure 12:
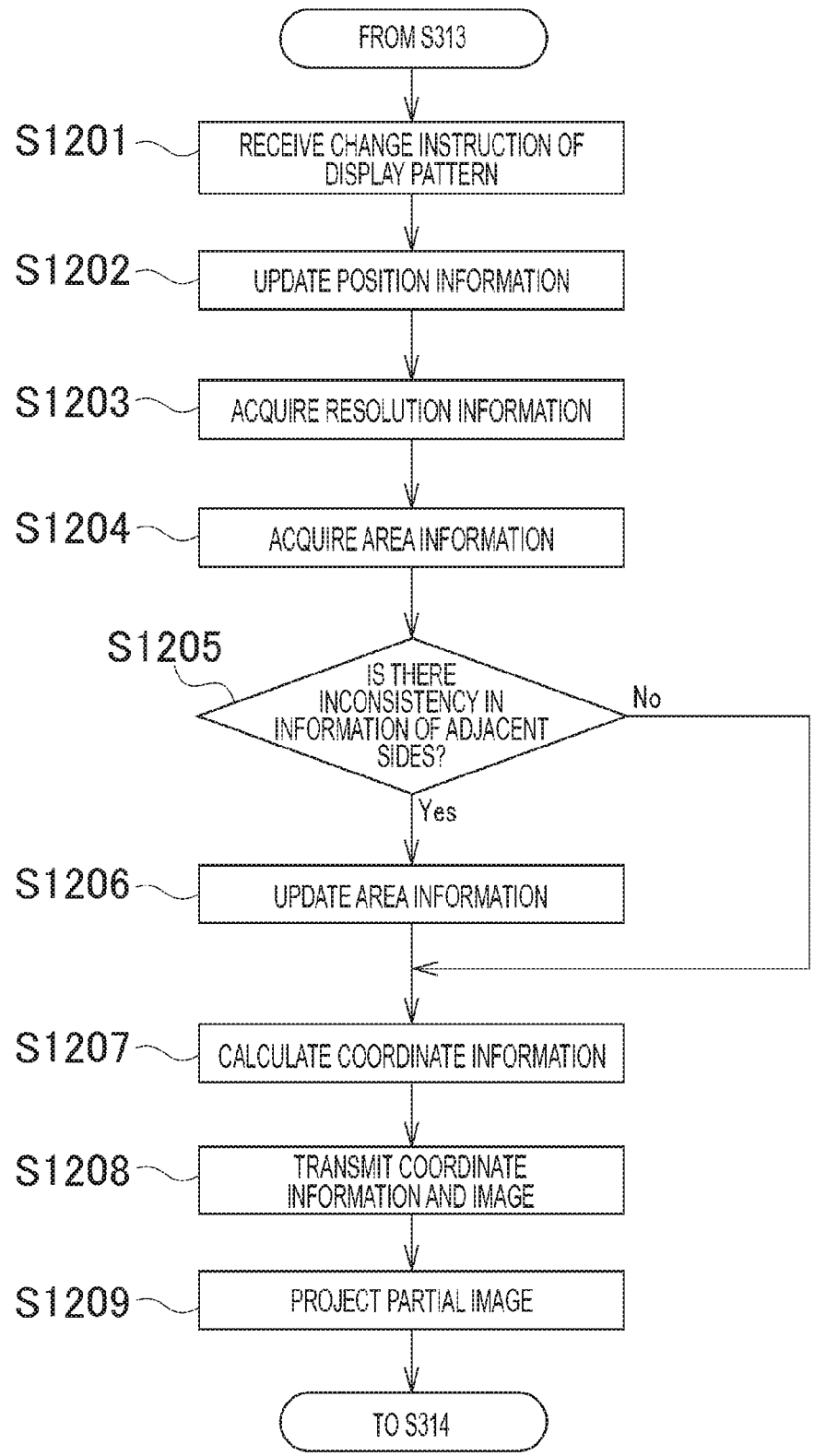
FIG. 12 is a flowchart illustrating an example of change processing in the third embodiment.

Next, a multiple projection system in the third embodiment will be described. In the third embodiment, the description of the same configuration and processing as those in the first and the second embodiments will be omitted. In the third embodiment, a multiple projection system will be described where when each of the projectors 100a to 100d projects a partial image based on, for example, the display pattern 402, the display pattern is changed to a different display pattern by a user. After the processing of S313 described in FIG. 3 is performed, the CPU 101a performs change processing illustrated in FIG. 12.

When the user operates at least either one of the operation key 107a and the remote control unit 109a and thereby the display pattern is changed, the CPU 101a performs S1201. In S1201, the CPU 101a receives a change instruction of the display pattern through the user IF 106a. After S1201 is performed, the CPU 101a performs S1202. In S1202, the CPU 101a updates the position information set in S305 based on the display pattern after change indicated by the change instruction of the display pattern and the display pattern before change. Hereinafter, regarding the processing of S1201, a case will be described in which the display pattern before change is the display pattern 402 and the display pattern after change is the display pattern 401. Further, a case will be described in which the display pattern before change is the display pattern 402 and the display pattern after change is the display pattern 403.

In the display pattern 402, the identification information is "1" and "2" from the left (the first column) of the first row and "3" and "4" from the left (the first column) of the second row. On the other hand, in the display pattern 403, the identification information is "1", "2", and "3" from the left (the first column) of the first row and "4", "5", and "6" from the left (the first column) of the second row. Therefore, the CPU 101a updates the position information stored in the RAM 103a so that the display pattern after change corresponds to the installation positions of the projectors 100a to 100d.

For example, the CPU 101a associates the IP address associated with the identification information "3" (the second row, the first column) of the display pattern 402 with the identification information "4" (the first row, the third column) of the display pattern 403 and stores the IP address into the RAM 103*a*. Further, the CPU 101*a* associates the IP address associated with the identification information "4" (the second row, the second column) of the display pattern 402 with the identification information "5" (the second row, the first column) of the display pattern 403 and stores the IP address into the RAM 103*a*. Although no IP address is associated with the identification information "3", if the IP address for the identification information "6" is set, the CPU 101*a* connects to a projector through the network IF 105*a* by using the IP address corresponding to the identification information "6". If the CPU 101*a* cannot establish a connection with the projector by using the IP address corresponding to the identification information "6", it is assumed that no projector to be a connection destination is installed.

After S1202 is performed, the CPU 101*a* performs S1203. In S1203, the CPU 101*a* requests resolution information from the projectors 100*b* to 100*d*. When the CPU 101*a* acquires all the resolution information from the projectors 100*b* to 100*d*, the CPU 101*a* performs S1204. The CPU 101*a* determines the resolution of a projector of which resolution information cannot be acquired to be the same as the resolution of another projector. For example, if the CPU 101*a* cannot acquire the resolution information from the projector 100*b*, the CPU 101*a* determines that the resolution of the projector 100*b* is the same as the resolution of the projector 100*c* adjacent to the projector 100*b*. Further, for example, if the CPU 101*a* cannot acquire the resolution information from the projector 100*b*, the CPU 101*a* may determine that the resolution of the projector 100*b* is the same as the resolution of the projector 100*a* which is the master device.

In S1204, the CPU 101*a* requests area information from the projectors 100*b* to 100*d*. When the CPU 101*a* acquires all the area information from the projectors 100*b* to 100*d*, the CPU 101*a* performs S1205.

In S1205, the CPU 101*a* determines whether or not inconsistency occurs between adjacent sides based on the area information acquired in S1204. The adjacent sides are, for example, the right side of the image displayed in the area corresponding to the identification information "1" and the left side of the image displayed in the area corresponding to the identification information "2" in the display pattern 402.

When the CPU 101*a* determines that inconsistency occurs between adjacent sides (Yes in S1205), the CPU 101*a* performs S1206. When the CPU 101*a* determines that no inconsistency occurs between adjacent sides (No in S1205), the CPU 101*a* performs S1207. In S1206, the CPU 101*a* deletes the area information acquired in S324 from the RAM 103*a* and stores the area information acquired in S1204 into the RAM 103*a*. When the S1206 is performed, the area information is updated.

When the display pattern is changed from the display pattern 402 to the display pattern 403 by the user, the number of projectors that project partial images increases. In this case, the CPU 101*a* does not perform the processing of S1206 and maintains consistency between the projectors in the multiple projection system by using the area information acquired in S324.

Figure 13A:
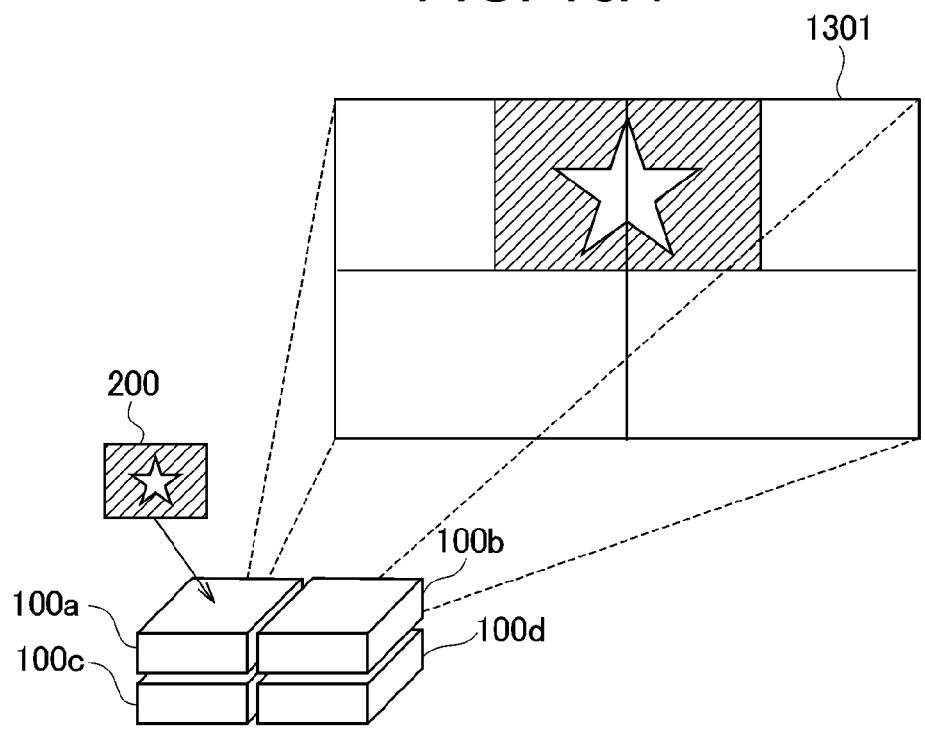
FIGS. 13A and 13B are diagrams illustrating an example of an image projected by the multiple projection system in the third embodiment.
Figure 13B:
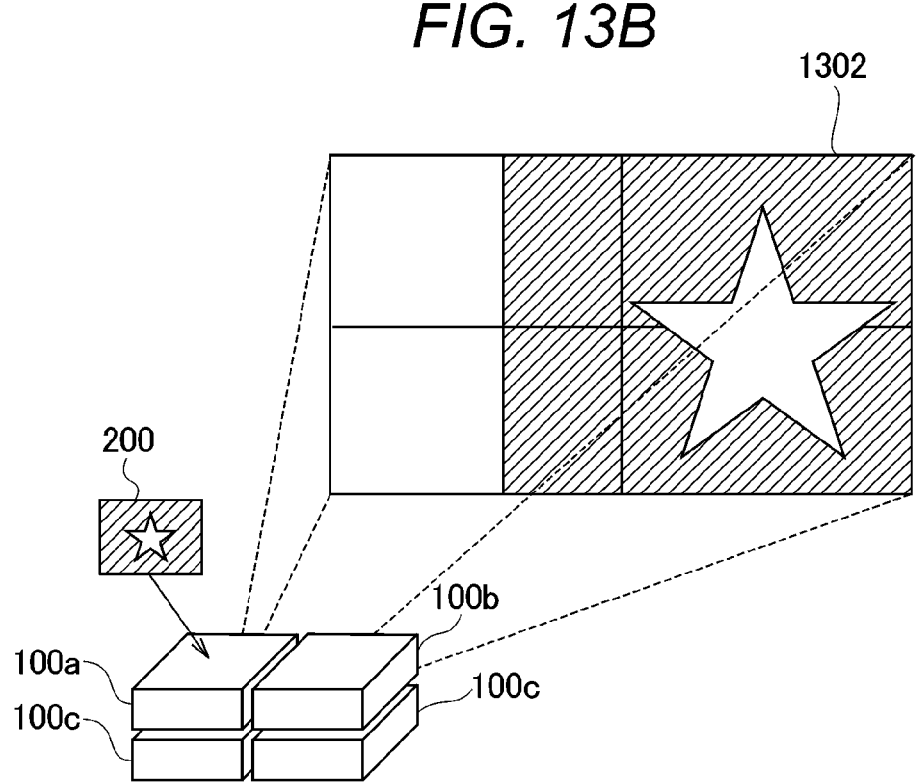

After S1206 is performed, the CPU 101*a* performs S1207. The processes of S1207 to S1209 are respectively the same as the processes of S311 to S313 illustrated in FIG. 3. FIG. 13A is a diagram illustrating an image 1301 displayed on the screen when the display pattern is changed from the display pattern 402 to the display pattern 401. FIG. 13B is a diagram illustrating an image 1302 displayed on the screen when the display pattern is changed from the display pattern 402 to the display pattern 403.

In the multiple projection system in the third embodiment, when the display pattern is changed by the user, the master device resets the projection positions of the slave devices based on the display pattern before change and the display pattern after change.

Thereby, in the multiple projection system in the third embodiment, it is possible to automatically set the projection positions of the slave devices by changing the display pattern by the user.

It is assumed that the multiple projection system in the third embodiment has the same effect as that of the first and the second embodiments regarding the same configuration and processing as those of the first and the second embodiments.

In the description of the first, the second, and the third embodiments, the master device is the projector 100*a* and the slave devices are the projectors 100*b* to 100*d*. However, it is not limited to this. For example, the master device may be the projector 100*d* and the slave devices may be the projectors 100*a* to 100*c*.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-076125, filed Apr. 2, 2015, which is hereby incorporated by reference herein in its entirety.

What is claimed is:
1. A projection device comprising:
a projection unit configured to project an image;

a communication unit configured to communicate with an external projection device; and a control unit configured to control the projection unit to project a predetermined image indicating a plurality of areas indicating positional relationship of a plurality of projection images, area information on each of the areas, and identification information on the external projection device associated with each of the areas, in a case where an image to be projected by the projection unit and an image to be projected by the external projection device are arranged and projected, and wherein the communication unit transmits the area information associated with the external projection device to the external projection device in order that the external projection device displays an image corresponding to the area information.

2. The projection device according to claim 1, wherein the identification information on the external projection device is an IP address.

3. The projection device according to claim 1, wherein the area information is different for each of the areas.

4. The projection device according to claim 1, further comprising a selection unit configured to select a pattern of positions of a plurality of projection images.

5. The projection device according to claim 1, wherein the predetermined image includes an input field in which association between the area information and the identification information on the external projection device is input by a user operation.

6. The projection device according to claim 5, further comprising a notification unit configured to notify that subnets are different from each other, in a case where a subnet of first identification information input in the input field and a subnet of second identification information input in the input field are different from each other.

7. A control method for a projection device including a projection unit that projects an image and a communication unit that communicates with an external projection device, the control method comprising:

controlling the projection unit to project a predetermined image indicating a plurality of areas indicating positional relationship of a plurality of projection images, area information on each of the areas, and identification information on the external projection device associated with each of the areas, in a case where an image to be projected by the projection unit and an image to be projected by the external projection device are arranged and projected; and transmitting the area information associated with the external projection device to the external projection device by the communication unit in order that the external projection device displays an image corresponding to the area information.

8. The control method according to claim 7, wherein the identification information on the external projection device is an IP address.

9. The control method according to claim 7, wherein the area information is different for each of the areas.

10. A non-transitory storage medium storing a program for causing a computer to execute a control method for a projection device including a projection unit that projects an image and a communication unit that communicates with an external projection device, the control method comprising:

controlling the projection unit to project a predetermined image indicating a plurality of areas indicating positional relationship of a plurality of projection images, area information on each of the areas, and identification information on the external projection device associated with each of the areas, in a case where an image to be projected by the projection unit and an image to be projected by the external projection device are arranged and projected; and transmitting the area information associated with the external projection device to the external projection device by the communication unit in order that the external projection device displays an image corresponding to the area information.

* * * * *